United States Patent [19]

Meyer et al.

[11] 4,424,313

[45] Jan. 3, 1984

[54] REACTIVE POLYMERS CONTAINING CARBOXYL GROUPS, A PROCESS FOR THE PRODUCTION THEREOF, AND THE USE THEREOF AS BINDER COMPONENTS FOR POWDER LACQUERS

[75] Inventors: Rolf-Volker Meyer; Hans-Joachim Kreuder, both of Krefeld; Peter Höhlein, Kempen, all of Fed. Rep. of Germany

[73] Assignee: Bayer Aktiengesellschaft, Leverkusen, Fed. Rep. of Germany

[21] Appl. No.: 461,738

[22] Filed: Jan. 12, 1983

[30] Foreign Application Priority Data

Feb. 9, 1982 [DE] Fed. Rep. of Germany ....... 3204333

[51] Int. Cl.³ .................... C08F 283/00; C08G 63/76; C08L 63/00; C08L 67/00

[52] U.S. Cl. .................... 525/438; 528/288; 528/289; 528/292; 528/296

[58] Field of Search ............... 525/438; 528/288, 289, 528/292, 296

[56] References Cited

U.S. PATENT DOCUMENTS

| 3,932,358 | 1/1976 | de Cleur et al. ............... 528/288 |
| 4,223,097 | 9/1980 | Johannes et al. ............... 525/438 |
| 4,288,569 | 9/1981 | Rottmaier et al. ............... 525/438 |

*Primary Examiner*—Lucille M. Phynes
*Attorney, Agent, or Firm*—Connolly and Hutz

[57] ABSTRACT

The reaction of polymers containing carboxyl groups with organic nitrogen bases which have certain structural features leads to highly reactive products which are eminently suitable as binder components for powder lacquers which may be hardened with polyepoxides.

9 Claims, No Drawings

REACTIVE POLYMERS CONTAINING CARBOXYL GROUPS, A PROCESS FOR THE PRODUCTION THEREOF, AND THE USE THEREOF AS BINDER COMPONENTS FOR POWDER LACQUERS

This invention relates to reactive polymers containing carboxyl groups, preferably polyester polycarboxylic acids, to a process for the production thereof and to the use thereof as binder components for power lacquers which are hardened by polyepoxides.

Pulverulent coating compounds which may be applied to a substrate by whirl sintering, flame spraying or the electrostatic powder spray process are known. They should be able to be stoved at moderately high temperatures within as short a time as possible to produce cross-linked coatings. Care must be taken to ensure that no reaction between resin and hardener takes place during extrusion of the mixture of binder, pigments, fillers and optionally other auxilliary agents at temperatures of from 80° to 140° C., preferably from 90° to 120° C., but at the same time there is a demand for always shorter stoving times at low temperatures, which means that increased reactivity is required.

Although it is possible to provide the resin component with such a high number of carboxyl groups that a complete reaction is achieved under stoving conditions of from 150° to 160° C./30 minutes, the high acid number causes an unwanted preliminary reaction to take place even during the extrusion process and this reaction may only be kept within tolerable limits by vigorous cooling of the extruded substance. The storage stability is also impaired by the fact that, even at room temperature an unwanted reaction takes place which has an adverse effect on the flow properties of the powder lacquer and/or the mechanical properties of the stoved lacquer coat. This behaviour of polymers which contain carboxyl groups is to a large extent independent of the choice of polyepoxide used for the hardening reaction and it may be observed, for example, both in the case of tris-glycidylisocyanurate and in the case of tris-glycidyl-urazole.

It is known that the hardening of polymers containing carboxyl groups by means of polyepoxides may be accelerated by catalysts, such as dicyandiamides or heterocyclic nitrogen compounds, such as imidazolines (German Offenlegungs 2,248,776) or tetrahydropyrimidines (German Offenlegungsschrift No. 2,751,805). It is advisable, however, to block the basic catalysts, e.g. with isocyanates, in order to prevent unwanted cross-linking during production of the powder lacquer which is to be stoved (milling and homogenising the individual components at from 80° to 140° C. in the extruder). The most difficult step of such a procedure is that of obtaining uniform distribution of the catalysts which are only used in small quantities and which are necessary for uniform flow of the powder lacquer and a constant coating quality.

A process for the production of matt coatings based on powder lacquers has been disclosed in German Offenlegungsschrift No. 2,324,696, in which polyepoxides and salts of at least tribasic carboxylic acids, such as trimellitic acid, pyromellitic acid, butane tetracarboxylic acid or cyclopentane tetracarboxylic acid, and certain amidines, preferably 2-phenyl-imidazoline, are reacted together with a view to obtaining a matt surface. The powder lacquers described, however, have a poor gloss when prepared with long chain epoxides and lead to brittle coatings when prepared with short chain epoxides.

It was therefore an object of the present invention to provide powder lacquer systems which would not have the disadvantages described above.

It has surprisingly been found that polymers containing carboxyl groups fulfil this object if they are partly neutralized with certain organic nitrogen bases.

The present invention relates to reactive polymers containing carboxyl groups, preferably polyester polycarboxylic acids, having average molecular weights $\overline{M}_n$ of from 2,500 to 25,000, preferably from 3,000 to 20,000, characterised in that from 0.1 to 25%, preferably from 2 to 15%, of the carboxyl groups originally present are in the form of a salt of at least one organic nitrogen base having the structural feature:

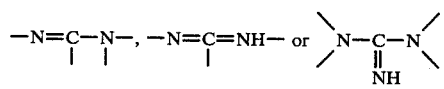

The molecular weight $M_n$, determined as numerical average, refers to the polymers before salt formation. It is determined by vapour pressure osmometry for molecular weights up to 5,000 and by membrane osmometry using acetone as solvent for molecular weights above 5,000.

The present invention further relates to a process for the production of reactive polymers containing carboxyl groups, characterised in that at least one carboxyl group-containing polymer having an average molecular weight $M_n$ of from 2,500 to 25,000, preferably from 3,000 to 20,000, and an acid number of from 10 to 150 is reacted with at least one organic nitrogen base having the structural feature:

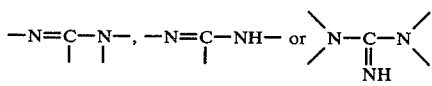

at a temperature of from 170° to 250° C., preferably from 180° to 210° C., in such proportions that from 0.1 to 25%, preferably 2 to 15%, of the carboxyl groups of the polymer react with the nitrogen base with salt formation.

The reaction times may range from 10 min. to 5 hours, preferably from 30 minutes to 2 hours, depending on the nature of the polymers containing carboxyl groups, the nitrogen bases and the reaction temperatures.

The present invention also relates to the use of the present reactive carboxyl group-containing polymers as binder components for powder lacquers which are hardened by polyepoxides.

The carboxyl group-containing polymers used for salt formation are preferably polyester polycarboxylic acids obtained from polyols and polycarboxylic acids or derivatives thereof or from hydroxy carboxylic acids.

The carboxyl group-containing polymers used for salt formation should preferably have a melting or softening point (determined by differential thermoanalysis) of from 20° to 150° C., in particular from 50° to 100° C., an acid number of from 20 to 120, in particular from 30 to 50, and an OH number below 30, in particular below 10.

The polycarboxylic acids used for producing the polyester polycarboxylic acids which are to be used for salt formation are in particular those corresponding to the following general formula:

$$A(-COOH)_x \qquad (I)$$

wherein A represents a bond (when x=2) or an x-valent, optionally substituted aliphatic group preferably having from 1 to 20 carbon atoms, a cycloaliphatic group preferably having from 5 to 16 carbon atoms, an aliphatic-aromatic group preferably having from 7 to 20 carbon atoms, an aromatic group preferably having from 6 to 15 carbon atoms or an aromatic or cycloaliphatic group having from 2 to 12 carbon atoms and containing one or more hetero atoms, such as N, O or S, in the ring; and x represents an integer of from 2 to 4, preferably 2 or 3.

The following are preferred examples of such polycarboxylic acids:

oxalic acid, malonic acid, succinic acid, glutaric acid, adipic acid, trimethyl adipic acid, azelaic acid, sebacic acid, decane dicarboxylic acid, dodecane dicarboxylic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenylsulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid and the following:

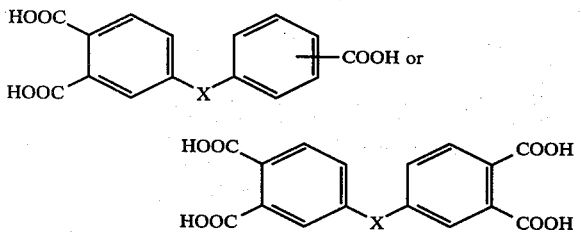

wherein X represents

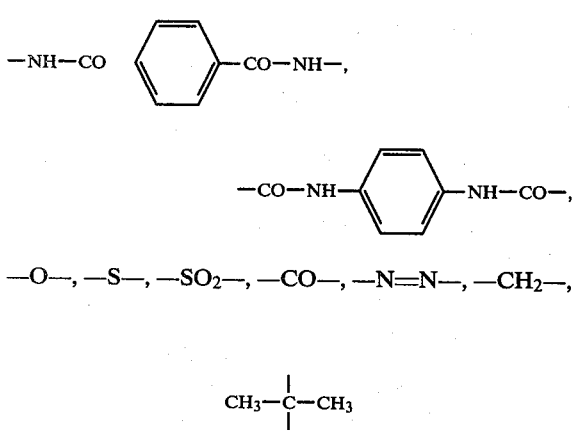

Among hydroxycarboxylic acids, it is preferred to use those corresponding to the following general formula:

$$(HOOC-)_yA(-OH)_z \qquad (II)$$

wherein A is as defined above; and y and z may independently represent an integer of from 1 to 3, preferably 1 or 2.

Preferred examples include glycollic acid, lactic acid, mandellic acid, malic acid, citric acid, tartaric acid, 2-, 3- and 4-hydroxy benzoic acid and hydroxybenzenedicarboxylic acids.

Suitable polyols for the production of the polyester polycarboxylic acids include in particular those corresponding to the following general formula:

$$B(-OH)_a \qquad (III)$$

wherein B represents an a-valent aliphatic group having from 2 to 20 carbon atoms, a cycloaliphatic group having from 5 to 16 carbon atoms, an araliphatic group having from 7 to 20 carbon atoms, an aromatic group having from 6 to 15 carbon atoms or a heterocyclic group having from 2 to 12 carbon atoms and containing N,O or S; and a represents an integer of from 2 to 6, preferably 2 or 3.

The following are preferred examples of such polyols: ethylene glycol, 1,2- and 1,3-propane diol, 1,2-, 1,3-, 1,4- and 2,3-butane diol, 1,5-pentane diol, 2,2-dimethyl-1, 3-propane diol, 1,6-and 2,5-hexane diol, 1,12-dodecane diol, 1,12-octadecane diol, 2,2,4- and 2,4,4-trimethyl-1,6-hexane diol, trimethylolpropane, trimethylolethane, glycerol, 1,2,6-hexane triol, pentaerythritol, mannitol, 1,4-bis-hydroxymethyl-cyclohexane, cyclohexane-1,4-diol, 2,2-bis-(4-hydroxy-cyclohexyl)-propane, bis-(4-hydroxy-phenyl)-methane, bis-(4-hydroxy-phenyl)-sulphone, 1,4-bis-hydroxy-methylbenzene, 1,4-dihydroxy-benzene, 2,2-bis-(4-hydroxy-phenyl)propane, 1,3-bis-hydroxy-alkyl-hydantoins, tris-hydroxy-alkyl-isocyanurates and tris-hydroxy-alkyl-triazolidine-3,5-diones.

Other polyols suitable for producing the polyester polycarboxylic acids include the hydroxy-alkyl ethers corresponding to general formula (IV) below obtained by the addition of substituted or unsubstituted alkylene oxides, such as ethylene oxide, propylene oxide, butylene oxide or styrene oxide, to the abovementioned polyols:

$$B\left[-O(-\underset{\underset{R^3}{|}}{\overset{\overset{R^1}{|}}{C}}-\underset{\underset{R^4}{|}}{\overset{\overset{R^2}{|}}{C}}-O)_m-H\right]_a \qquad (IV)$$

wherein B and a are as defined above; m represents an integer of from 1 to 7; and $R^1$, $R^2$, $R^3$ and $R^4$ independently represent hydrogen atoms, optionally halogen-substituted $C_1$–$C_{10}$ aliphatic groups, $C_4$–$C_8$ cycloaliphatic groups, $C_7$–$C_{17}$ araliphatic groups or $C_6$–$C_{16}$ aromatic groups optionally substituted one or more times with halogen, alkyl and/or alkoxy. $R^1$, $R^2$, $R^3$ and $R^4$ preferably represent hydrogen, alkyl groups having from 1 to 4 carbon atoms, preferably methyl or ethyl, or $C_6$–$C_{12}$ aryl groups which may be substituted one or more times with halogen atoms (e.g. chlorine or bromine), with $C_1$–$C_4$ alkyl groups and/or with $C_1$–$C_4$ alkoxy groups, but are preferably phenyl.

The following are preferred examples of such polyols: diethylene glycol, triethylene glycol, dipropylene glycol, tripropylene glycol, dibutylene glycol, 1,4-bis-(2-hydroxyethoxy)-cyclohexane, 1,4-bis-(2-hydroxy-ethoxy)-benzene, 4,4'-bis-(2-hydroxy-ethoxy)-diphenyl methane, -2-diphenyl propane, -diphenyl ether, -diphenyl sulphone, -diphenyl ketone and -diphenyl cyclohexane.

The carboxylic acids and carboxylic acid derivatives and polyols used may, of course, also be oligomers, such as aromatic dicarboxylic acid esters corresponding to the following general formula:

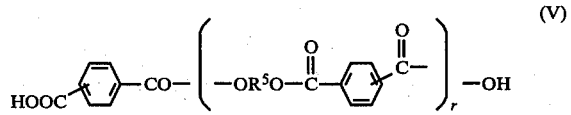

and aliphatic dicarboxylic acid esters corresponding to the following general formula:

HOOC(—CH$_2$)$_s$—CO[OR$^6$—OOC(—CH$_2$)$_t$—CO]-$_r$OH wherein $R^5$ and $R^6$ independently represent an at least divalent aromatic group having from 6 to 15 carbon atoms, an araliphatic group having from 7 to 20 carbon atoms, a saturated or unsaturated aliphatic group having from 2 to 20 carbon atoms or a cycloaliphatic group having from 5 to 15 carbon atoms which may be condensed with aromatic ($C_6$–$C_{12}$), cycloaliphatic ($C_4$–$C_{12}$) or heterocyclic ($C_2$–$C_{12}$) ring systems and may contain ether, keto, ester or sulpho bridges and may be substituted one or more times by halogen or nitro or alkoxy groups having from 1 to 20 carbon atoms; r represents an integer of from 1 to 20; and s and t independently represent zero or an integer of from 1 to 20.

The following are preferred examples of $(R^5)_r$ and $(R^6)_r$:

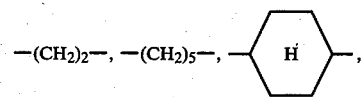

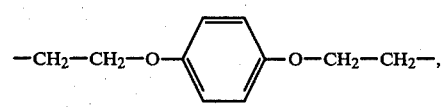

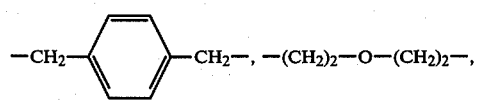

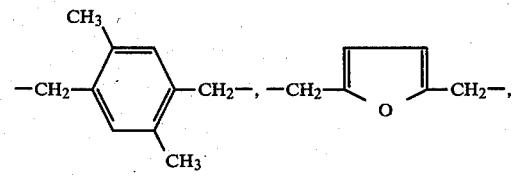

-continued

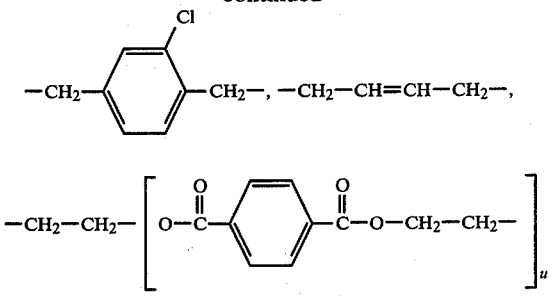

wherein u represents an integer of from 1 to 7.

These polyester polycarboxylic acids may be produced by known methods, generally by melting the polycarboxylic acids and polyols together and removing the water liberated, possibly by application of a vacuum or by purging with nitrogen. The course of the reaction may be followed by titration of the excess carboxyl groups so that the end of the reaction may easily be determined.

The polyester polycarboxylic acids may, of course, also be prepared by the reaction of hydroxyl polyesters (obtained by known methods from polycarboxylic acids, anhydrides, acid chlorides and/or alkyl esters and polyols) with polycarboxylic acids and anhydrides. Such polyesters containing hydroxyl groups may, of course, also be reacted with low molecular weight acid polyesters, i.e. polyesters containing carboxyl groups, to produce the polyester polycarboxylic acids.

Another group of carboxyl group-containing polymers which may be used for salt formation are the carboxyl-containing copolymers consisting of copolymerised units of from 2 to 25 parts, by weight, of at least one copolymerisable α,β-ethylenically unsaturated carboxylic acid having from 3 to 5 carbon atoms and from 75 to 98 parts, by weight, of at least one other copolymerisable monomer. The α,β-ethylenically unsaturated carboxylic acids may be monocarboxylic acids or dicarboxylic acids or semi-esters of dicarboxylic acids having from 1 to 12 carbon atoms in the alcohol component.

The following are preferred copolymerisable monomers:

(I) Maleic acid diesters and esters of acrylic or methacrylic acids with $C_1$–$C_{12}$ aliphatic, $C_5$ or $C_6$ cycloaliphatic or $C_7$ or $C_8$ araliphatic monohydric alcohols; for example, methyl acrylate, ethyl acrylate, n-propyl acrylate, isopropyl acrylate, n-butyl acrylate, tertiary butyl acrylate, 2-methyl-hexyl acrylate, 2-ethyl-hexyl acrylate, dodecyl acrylate and the corresponding methacrylic acid esters and maleic acid diesters; cyclopentyl acrylate, cyclohexyl acrylate and the corresponding methacrylic acid esters and maleic acid diesters; benzyl acrylate, β-phenyl-ethyl acrylate, the corresponding methacrylic esters and maleic acid diesters;

(II) Aromatic vinyl and vinylidene compounds; for example, styrene, α-methyl styrene, α-methyl -p-isopropyl styrene, α-methyl-m-isopropyl styrene, o-and p-chlorostyrene, o- and p-bromostyrene, methyl styrenes substituted in the nucleus, p-tertiary butyl styrene and mixtures thereof;

(III) Vinyl esters of organic monocarboxylic acids wherein the acid component contains from 2 to 4 carbon atoms, such as vinyl acetate and vinyl propionate;

(IV) Mono-olefinically unsaturated halogenated hydrocarbons, such as vinyl chloride or vinylidene chloride, vinyl chloride being preferred;

(V) Acrylonitrile, methacrylonitrile, acrylamide and methacrylamide;

(VI) Vinyl alkyl ethers having from 1 to 4 carbon atoms in the alkyl group, such as vinyl methyl ether, vinyl ethyl ether, vinyl propyl ether and vinyl butyl ether.

Preferred copolymers containing carboxyl groups consist of polymerised units of:

(a) from 0 to 80%, by weight, of styrene, α-methyl styrene, o- and/or p-chlorostyrene, o- and/or p-bromostyrene, p-tertiary butyl styrene or mixtures thereof, preferably styrene;

(b) from 0 to 98%, by weight, of acrylic acid esters having aliphatic $C_1$–$C_8$ alcohol groups or methacrylic acid esters having aliphatic $C_1$–$C_8$ alcohol groups, or mixtures thereof; and (c) from 2 to 25%, by weight, of acrylic acid, methacrylic acid, itaconic, maleic and fumaric acid semi-esters having from 1 to 8 carbon atoms in the alcohol component, or mixtures thereof, preferably acrylic acid and/or methacrylic acid;

the sum of the percentages of (a) to (c) amount to 100. Instead of (c), the copolymers may contain from 2 to 25%, by weight, of residues of at least one olefinically unsaturated copolymerisable monomer containing hydroxyl groups, such as hydroxy alkyl esters of acrylic, methacrylic, maleic, fumaric or itaconic acids having from 2 to 4 carbon atoms in the alcohol moiety.

When monomers containing hydroxyl groups are used, the products obtained are hydroxyl group-containing copolymers which may be converted into carboxyl group-containing copolymers by reaction with carboxylic acid anhydrides, such as succinic acid anhydride.

The term "copolymers" is used herein to denote not only copolymers wherein the incorporated monomers are in statistical distribution or block copolymers, but also graft copolymers wherein monomers have been grafted on a preformed homo- or co-polymer. Statistical copolymers are preferred.

Production of the carboxyl group-containing copolymers used for salt formation is carried out by known methods, such as solvent-free, solution, dispersion or bead polymerisation, preferably by solution or solvent-free polymerisation. Such methods have been described, for example, in "Methoden der Organischen Chemie" (Houben-Weyl) 4th Edition, Volume 14/1 pages 24–556, Georg Thieme Verlag, Stuttgart, 1961, and in German Offenlegungsschrift Nos. 2,600,318 and 1,965 740.

Guanidines and amidines, e.g. imidazolines, tetrahydropyrimidines and other cyclic amidines, are preferred organic nitrogen bases.

Preferred guanidines for salt formation are compounds corresponding to the following general formula:

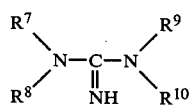

(VI)

wherein $R^7, R^8, R^9$ and $R^{10}$ independently represent a hydrogen atom, a $C_1$–$C_{12}$ alkyl group, a $C_5$–$C_{12}$ cycloalkyl group, a $C_7$–$C_{12}$ aralkyl group or a $C_6$–$C_{12}$ aryl group, preferably a $C_1$–$C_4$ alkyl group or a phenyl group.

The following are examples of preferred guanidines (VI):

N-methyl guanidine,
N-ethyl guanidine,
N-butyl guanidine,
N-methyl-N'-ethyl guanidine,
N,N'-dimethyl guanidine,
N,N'-diethyl guanidine,
N-methyl-N'-isopropyl guanidine,
N,N'-dibutyl guanidine,
N,N,N'-trimethyl guanidine,
N,N,N',N'-tetramethyl guanidine,
N,N,N',N'-tetraethyl guanidine,
N-phenyl guanidine,
N,N'-diphenyl guanidine,
N,N'-ditolyl guanidine,
N-formyl guanidine and
N-butyryl guanidine.

The following compounds are also suitable amidines for salt formation: formamidine, acetamidine, caproylamidine, benzamidine, benzylimino-caprolactam, n- and t-butyl-iminocaprolactam, N-ethyl-N'-benzyl-benzamidine, N-t-butyl-N'-benzyl-acetamidine and N-n-butylamino-N'-benzyl-acetamidine.

It is preferred, however, to use imidazolines corresponding to the following general formula:

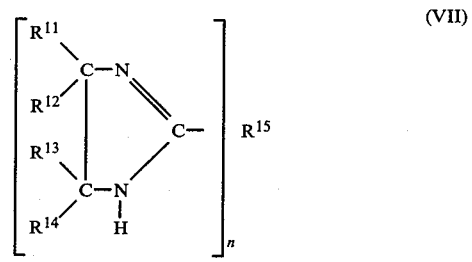

(VII)

ps wherein $R^{11}, R^{12}, R^{13}$ and $R^{14}$ independently represent a hydrogen atom, an alkyl group having from 1 to 6 carbon atoms, a cycloalkyl group having from 5 to 10 carbon atoms, an aralkyl group having from 7 to 12 carbon atoms, an aryl group having from 6 to 15 carbon atoms or a heterocyclic group having from 5 to 10 carbon atoms and 1 or 2 oxygen, nitrogen and/or sulpher atoms;

$R^{15}$ represents an alkyl or alkylene group having from 1 to 6 carbon atoms or an aryl or arylene group having from 6 to 15 carbon atoms, any of which may be substituted one or more times by alkyl, cycloalkyl, aralkyl, aryl or heterocyclic groups (as defined for $R^{11}, R^{12}, R^{13}$ and $R^{14}$);

n represents 1 or 2; and $R^{15}$ may also represent a hydrogen atom when n=1.

The following are examples of preferred imidazolines (VII): 2-phenylimidazoline, 2-phenyl-4-methylimidazoline, 2-(m-tolyl)-4-methyl-imidazoline, 2-(m-pyridyl)-imidazoline, 1,4-tetramethylene-bis-(4-methyl-imidazoline), 2-methyl imidazoline,2,4-dimethyl-imidazoline, 2-ethyl-imidazoline, 2-ethyl-4-methyl-imidazline, 2-benzyl-imidazoline, 2-(o-tolyl)-imidazoline, 2-(p-tolyl)-imidazoline, tetramethylene-bis-(imidazoline), 1,1,3-trimethyl-1,4-tetramethylene-bis-imidazoline, 1,1,3-trimethyl-1,4-tetramethylene-bis-(4-methyl-imidazoline), 1,3,3-trimethyl-1,4-tetramethylene-bis-(4-methyl-imidazoline), 1,2-phenylene-bis-imidazoline and 1,3-phenylene-bis-(4-methyl-imidazoline). Mixtures of the imidazoline derivatives may also be used. 2-phenyl-imidazoline and 2-methyl-imidazoline are particularly preferred.

Compounds from the series of tetrahydropyrimidines used for salt formation include those corresponding to the following general formula:

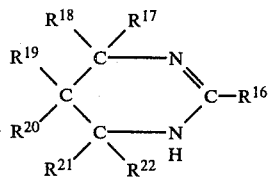

(VIII)

wherein
$R^{16}$ to $R^{22}$ independently represent a hydrogen atom, an alkyl group having from 1 to 6 carbon atoms, a cycloalkyl group having from 5 to 10 carbon atoms, an aralkyl group having from 7 to 12 carbon atoms or an aryl group having from 6 to 15 carbon atoms.

In the above general formula, two geminal or vicinal substituents together with the carbon atom to which they are attached may form a cycloaliphatic ring having 5 or 6 carbon atoms.

Examples of preferred tetrahydropyrimidines (VIII) are: 2-methyl-tetrahydropyrimidine, 2,4-, 2,5- and 2,6-dimethyl-tetrahydropyrimidine, 2-ethyl-tetrahydropyrimidine, 2-ethyl-4-methyl-tetrahydropyrimidine, 2-benzyl-tetrahydropyrimidine, 2-phenyl-tetrahydropyrimidine, 2-phenyl-4-methyl, -5-methyl- and -6-methyl-tetrahydropyrimidine, 2,4-diaza-3-phenyl-7,9,9- and -7,7,9-trimethyl-bicyclo(4,3,0)-nonene -2, and 2,4-diaza-3-methyl-7,9,9- and -7,7,9-trimethyl-bicyclo (4,3,0) - nonene-2 and mixtures of these tetrahydropyrimidines.

Also preferred are bicyclic amidines corresponding to the following general formula:

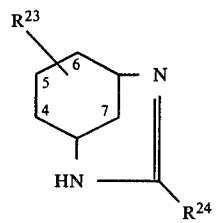

(IX)

wherein
$R^{23}$ represents a hydrogen atom or an alkyl group having from 1 to 4 carbon atoms, hydrogen and methyl being preferred; and
$R^{24}$ represents a hydrogen atom, an alkyl group having from 1 to 22 carbon atoms, a cycloalkyl group having from 5 to 14 carbon atoms, an aralkyl group having from 7 to 16 carbon atoms or an aryl group having from 6 to 20 carbon atoms (preferably phenyl).

The bicyclic amidines obtainable from substituted or unsubstituted 1,3-diaminocyclohexanes are particularly suitable compounds for the purpose of the present invention. Those products wherein $R^{23}$ represents methyl and $R^{24}$ represents H, 2-ethylhexyl, stearyl or phenyl are particularly preferred.

Other preferred organic nitrogen bases having the structure

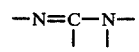

include tertiary amines, e.g. the following:

2-benzylimino-N—methyl-caprolactam

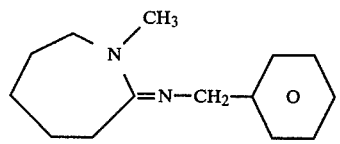

2-benzylimino-N—methyl-butyrolactam

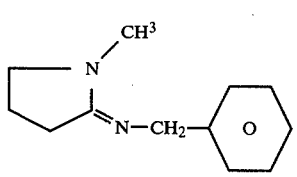

2-butylimine-1-methyl-butyrolactam

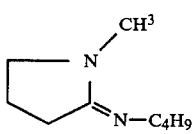

1,5-diazabicyclo(11,4,0) heptadec-5-ene 1-methyl-4-(2-tetrahydroazepinyl)piperazine

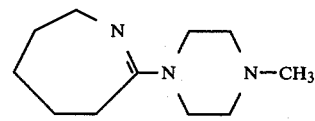

phenyl-methyl-2-tetrahydroazepinyl-amine

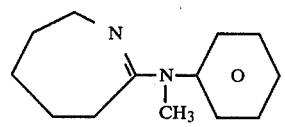

4-(2-tetrahydroazepinyl)-morpholine

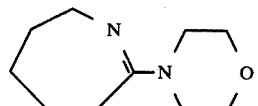

1,4-diazabicyclo(5,3,0) dec-4-ene

-continued

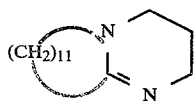

1,5-diazabicyclo(4,3,0)
non-5-ene

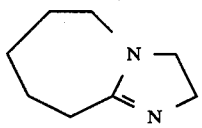

7,8,9,10-tetrahydro-
6H—azepino(1,2-a)
benzimidazole

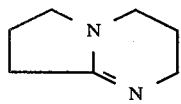

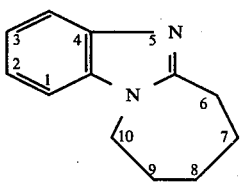

The organic nitrogen bases may be used as unpurified crude products since the by-products generally do not interfere with the process.

The reactive carboxyl group-containing polymers according to the present invention are prepared by adding the organic nitrogen base to the carboxyl group-containing polymers during or after the synthesis of these polymers.

The polyepoxides to be used as hardeners for the reactive carboxyl group-containing polymers according to the present invention include compounds containing more than one 1,2-epoxide group per molecule, e.g. triglycidyl isocyanurate (TGIC), triglycidyl urazole (TGUZ), glycidyl ethers (such as those based on bisphenol A) and glycidyl esters (such as those of phthalic acid, tetrahydrophthalic acid and hexahydrophthalic acid) having melting points of from 50° to 120° C. and an epoxide equivalent of from 170 to 4,000, preferably from 400 to 2,000.

The molar proportions in which the reactive carboxyl group-containing polymers according to the present invention are mixed with epoxide hardener are generally chosen so that from 0.6 to 1.5 epoxide groups, preferably from 0.8 to 1.25 epoxide groups, are provided for the sum of free carboxyl groups and carboxyl groups reacted with the organic nitrogen bases.

Auxiliaries and additives for powder lacquers, e.g. pigments, dyes, fillers, levelling agents, thickeners, de-aerating agents, UV stabilizers, oxidation inhibitors and quenchers (radical acceptors, such as N-alkyl substituted piperidines), as well as matting agents and substances which improve the surface smoothness, may, of course, also be incorporated in the conventional manner.

The powder lacquers are generally produced as follows:

The reactive carboxyl group-containing polymer according to the present invention is first mixed with the chosen polyepoxide and optionally other additives and homogenised in the molten solvent-free state. This may be carried out in suitable apparatus, such as heatable kneaders, but is preferably carried out by extrusion at an extrusion temperature which causes a maximum of shearing force to act on the mixture. The upper temperature limit should not exceed 140° C.

After cooling to room temperature and a suitable preliminary size reduction, the extruded mass is ground to a powder lacquer in order to reduce it to average particle sizes of from 40 to 90 μm, preferably ca. 50 μm, depending on the intended application. Course particles above 90 μm may be removed by screening.

The powder lacquers prepared as described above may be applied to suitable substrates by known methods, such as electrostatic powder spraying, whirl sintering, electrostatic whirl sintering or flame spraying or by the application of an aqueous suspension by desired methods.

After application of the powder lacquer by one of the methods mentioned above, the coated work pieces are heated to temperatures of from 140° to 190° C. to harden the lacquer, the heating time depending mainly on the thermal capacity of the coated work piece or its temperature before coating.

One important advantage of the reactive carboxyl group-containing polymers according to the present invention are resin components for powder lacquers is the increased elasticity and improved gloss compared with the products according to German Offenlegungsschrift No. 2,324,696. Other advantages are also achieved according to the present invention, including excellent compatability of the two components, resin and hardener, excellent levelling flow of the resulting coatings and the possibility of problem-free production of the powder lacquer mixtures due to the fact that the present reactive carboxyl group-containing polymers also function as catalysts for hardening, but the catalytic activity does not yet come into play at the temperatures of up to 120° C. required for mixing the components. Premature cross-linking of the components, which is always a risk when free catalysts are added, is thereby avoided.

The parts mentioned in the Examples which follow are parts, by weight, unless otherwise indicated.

EXAMPLES

A. Preparation of the organic nitrogen bases

I. Preparation of the amidine corresponding to formula IX with R=phenyl

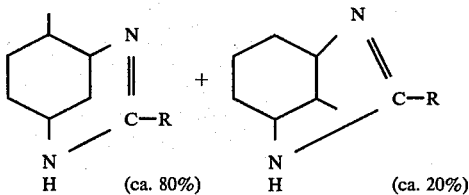

768 g (6 mol) of 2,4-diamino-(methyl-cyclohexane) (mixture of isomers), hereinafter referred to as "PH-tolamine" and 200 ml of water were introduced with stirring under a nitrogen atmosphere into a 4 liter 3-necked flask equipped with stirrer, thermometer and Claisen bridge with a 1 liter receiver flask. 732 g (6 mol) of benzoic acid were introduced portionwise into this aqueous mixture over a period of 30 minutes. The temperature rose to 80° C. The reaction mixture was then rapidly heated to 250° C. and water and excess PH-tolamine distilled off. The reaction was terminated after 4 hours at 250° C. The reaction product left behind was distilled at ca. 0.3 mbar (up to 240° C.). 733 g of crude product which solidified to yellowish crystals were obtained. Distillation of the crude product yielded as main fraction: ($Bp_{0.3\ mbar}$/160°-195° C.) 671 g of amidine, white crystals; MP 50°-60° C.

II. Preparation of the amidine of formula IX with R=H 736 g (16 mol) of formic acid were added portionwise to 2048 g (16 mol) of PH-tolamine and 400 ml of water over a period of 2 hours by the method described under I. The temperature rose to 90° C. The reaction mixture was then rapidly heated to 250° C., so that water and excess PH-tolamine distilled off. The reaction was completed after 4 hours further stirring at 250° C. The reaction product left behind was distilled at ca. 0.3 mbar (up to 200° C.). 806 g of crude product (yellow oil, $Bp_{0.3}$ 120°-170° C.) were obtained. Distillation of the crude product yielded, as main fraction ($Bp_{0.3\ mbar}$/107°-130° C.), 595 g of yellow oil which gradually solidified to a resin having a softening point of 45°-55° C.

III. Preparation of the amidine of formula IX with R=$C_{17}H_{35}$ 2048 g (16 mol) of PH-tolamine were introduced into a 10 liter vessel according to the method described under I. A solution of 3418 g (12 mol) of stearic acid in 1 liter of toluene was added under a nitrogen atmosphere with stirring in the course of 1½ hours. When all the solution had been added, the reaction mixture was heated to 250° C. for 4 hours, during which toluene, excess PH-tolamine and water of condensation distilled off and the mixture was then stirred for 4 hours at 250° C. until the end of the reaction.

The reaction vessel was left to cool to ca. 100° C. and the reaction product was then discharged. 4,450 g of a light brown wax was having a softening range of 36°-44° C. were obtained. This crude product is ready for use without further purification.

B. Preparation of the reactive carboxyl group-containing polymers

Reactive polyester IV 12 g of the amidine prepared according to method II were added at 200° C. to 1.2 kg of carboxyl polyester A which was obtained from terephthalic acid, isophthalic acid, trimelltic acid anhydride and neopentyl glycol and had an acid number of 35 (Mp according to DTA: 75° C.), and the reaction mixture was stirred for 30 minutes. The reactive polyester was then discharged over a band and flaked off. The almost colourless product had an acid number of 34 and a melting point according to DTA of 73° C. Approximately 12% of the carboxyl groups were neutralised.

Reactive polyesters V and VI 12 g of the amidine obtained according to method I resp. 12 g of the amidine of method III were added to the solvent-free melt of polyester A according to method IV and the reactive polyesters were obtained in analogous manner.

The almost colourless products had acid numbers of 33.3 (amidine of method I, ca. 5% of carboxyl groups neutralised) or 33.0 (amidine of method III, ca. 4% of carboxyl groups neutralised).

Reactive polyesters VII to IX

Various carboxyl polyesters were partially neutralised according to method IV with the amidine obtained according to method III. The polyesters and partly neutralised secondary products are described in the following Table.

| Polyester* | | before salt formation | | after salt formation | | NG (%)** |
|---|---|---|---|---|---|---|
| | | acid No. | Mp (DTA) | acid No. | Mp (DTA) | |
| VII | B of TPS, IPS, NPG and dimethylolcyclohexane | 50 | 71° C. | 48 | 69° C. | 3 |
| VIII | C of TPS, IPS, TMSA, NPG, EG and hexane-1,6-diol | 30 | 65° C. | 28 | 63° C. | 5 |
| IX | D of TPS, IPS, NPG, EG and glycerol | 45 | 73° C. | 43 | 70° C. | 3 |

**Degree of neutralisation of the carboxyl groups.
*TPS = terephthalic acid.
IPS = isophthalic acid
TMSA = trimellitic acid anhydride
NPG = neopentyl glycol
EG = ethylene glycol C. Preparation of powder lacquers Example 1

60.9 parts of the reactive carboxyl polyester obtained according to method IV were first mixed dry with 4.6 parts of triglycidyl isocyanurate, 33 parts of a highly stable titanium dioxide rutile and 0.4 parts of a levelling agent based on an acrylate oligomer. The mixture obtained was dispersed as a solvent-free melt on a laboratory extruder at temperatures of from 80° to 120° C. After cooling and preliminary size reduction, the extrudate was milled in a jet stream mill to a powder lacquer having an average particle size of 50 μm. After the coarse particles measuring above 90-100 μm had been screened off, the ready-for-use powder lacquer was sprayed on double-descaled, degreased test sheets (length 16.5 cm, width 65 mm, thickness 0.8 mm), using an electrostatic sprayer at a negative voltage of ca. 60 kV. The powder lacquers were subsequently stoved at 140° C., 160° C. and 180° C.

The coatings 50 μm (±5 μm) in thickness were tested by the following conventional methods:
Ericson cupping (DIN 53 156)→"Cupping"

Gloss, 60° (DIN 67 530)→"Gloss"
Impact reverse (Ball diameter 12.7 mm)→IMR 1 kg
Resistance to acetone assessed according to the following grading:

| | |
|---|---|
| −1 ... −5 | Number of strokes with wadding impregnated with acetone required to wear through the lacquer film |
| 2m | matt, soft film after 50 strokes |
| 2 1m | slightly matt, soft film after 50 strokes |
| 2 | soft film after 50 strokes |
| 1 | lacquer film slightly sensitive on the surface after 50 strokes |
| 0 | no change |

The grid section test according to DIN 53 151 gave the good result of Gt O/O in all Examples and comparison tests.

Examples 2 to 6

Various polyesters were partly neutralised as in Example 1 with various amidines according to methods V-1X for the production of powder lacquers and the coatings obtained were tested as described as in Example 1.

The characteristics of the polyesters and the properties of the coatings are shown in the following Table.

TABLE 1

| | Example 1 | Example 2 | Example 3 | Example 4 | Example 5 | Example 6 |
|---|---|---|---|---|---|---|
| Polyester used | A, method IV | A, method V | A, method VI | B, method VII | C, method VIII | D, method IX |
| Gelling time at 180° C. (sec.) | 109 | 103 | 67 | 122 | 178 | 133 |
| Cupping (mm) | | | | | | |
| 30 min/140° C. | >10 | >10 | >10 | >10 | >10 | >10 |
| 10 min/160° C. | >10 | >10 | >10 | >10 | 8.3 | >10 |
| 15 min/180° C. | >10 | >10 | >10 | >10 | >10 | 9.1 |
| IMR (cm kg) | | | | | | |
| 30 min/140° C. | 40 | 90 | 150 | −5 | −5 | 10 |
| 10 min/160° C. | 60 | 80 | 150 | −5 | −5 | −5 |
| 15 min/180° C. | 150 | 150 | 150 | 10 | 60 | 90 |
| Gloss (60° <) | | | | | | |
| 30 min/140° C. | 88 | 83 | 74 | 94 | 93 | 96 |
| 10 min/160° C. | 92 | 90 | 81 | 94 | 95 | 96 |
| 15 min/180° C. | 91 | 92 | 88 | 93 | 96 | 96 |
| Acetone resistance | | | | | | |
| 30 min/140° C. | 2 | 2m | 0-1 | 2m | 2m | 2m |
| 10 min/160° C. | 2 | 2m | 0-1 | 2m | 2m | 1 |
| 15 min/180° C. | 1 | 2m | 2 | 2 | 2 | 1 |

We claim:

1. Reactive polymers containing carboxyl groups and having average molecular weights $\overline{M}_n$ of from 2,500 to 25,000, characterised in that from 0.1 to 25% of the original carboxyl groups are present as a salt of at least one organic nitrogen base having the structural feature:

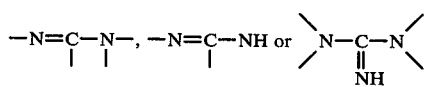

2. Polymers according to claim 1, characterised in that they are polyester polycarboxylic acids.

3. Polymers according to claims 1 and 2, characterised in that from 2 to 15% of the original carboxyl groups are present in salt form.

4. Polymers according to claims 1 to 3, characterised in that the organic nitrogen base is a guanidine corresponding to the following general formula:

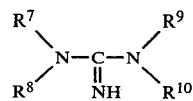

wherein
$R^7$, $R^8$, $R^9$ and $R^{10}$ independently represent a hydrogen atom, a $C_1$–$C_{12}$ alkyl group, a $C_5$–$C_{12}$ cycloalkyl group, a $C_7$–$C_{12}$ aralkyl group, a $C_6$–$C_{12}$ aryl group, preferably a $C_1$–$C_4$ alkyl group or a phenyl group.

5. Polymers according to claims 1 to 3, characterised in that the organic nitrogen base is an imidazoline corresponding to the following general formula:

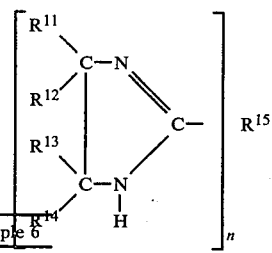

wherein
$R^{11}$, $R^{12}$, $R^{13}$ and $R^{14}$ independently represent a hydrogen atom, an alkyl group having from 1 to 6 carbon atoms, a cycloalkyl group having from 5 to 10 carbon atoms, an aralkyl group having from 7 to 12 carbon atoms, an aryl group having from 6 to 15 carbon atoms or a heterocyclic group having from 5 to 10 carbon atoms and 1 or 2 oxygen, nitrogen and/or sulphur atoms;
$R^{15}$ represents an alkyl or alkylene group having from 1 to 6 carbon atoms, an aryl or arylene group having from 6 to 15 carbon atoms, any of which may be substituted by alkyl, cycloalkyl, aralkyl, aryl or heterocyclic groups (as defined for $R^{11}$, $R^{12}$, $R^{13}$ and $R^{14}$);

n represents 1 or 2; and $R^{15}$ may also represent a hydrogen atom when $n=1$.

6. Polymers according to claims 1-3, characterised in that the organic nitrogen base is a tetrahydropyrimidine corresponding to the following general formula:

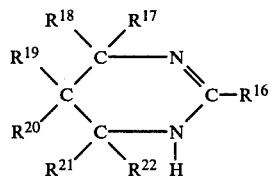

wherein $R^{16}$ to $R^{22}$ independently represent a hydrogen atom, an alkyl group having from 1 to 6 carbon atoms, a cycloalkyl group having from 5 to 10 carbon atoms, an aralkyl group having from 7 to 12 carbon atoms on an aryl group having from 6 to 15 carbon atoms;

and two geminal or vicinal substituents may, together with the carbon atom to which they are attached, form a cycloaliphatic ring having 5 to 6 carbon atoms.

7. Polymers according to claims 1-3, characterised in that the organic nitrogen base is a bicyclic amidine corresponding to the following general formula:

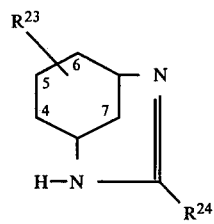

wherein $R^{23}$ represents a hydrogen atom or a methyl group; and $R^{24}$ represents a hydrogen atom, a $C_1$-$C_{22}$ alkyl group or a phenyl group.

8. Process for the production of the polymers according to claims 1-7, characterised in that at least one carboxyl group-containing polymer having average molecular weight $\overline{M}_n$ of from 2,500 to 25,000 and an acid number of from 10 to 150 is reacted with at least one organic nitrogen base having the structural feature:

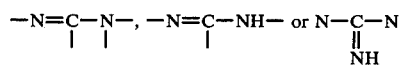

at a temperature of from 170° to 250° C. in such proportions that from 0.1 to 25% of the carboxyl groups of the polymer react with the nitrogen base until salt formation.

9. Use of the polymers according to claims 1-7 as binder component for powder lacquers which are hardened by polyepoxides.

* * * * *